United States Patent [19]

Barnett

[11] 3,881,237
[45] May 6, 1975

[54] SQUARE CUT BIAS BELT OF STEEL TIRE CORD
[75] Inventor: Thomas A. Barnett, Raleigh, N.C.
[73] Assignee: Monsanto Company, St. Louis, Mo.
[22] Filed: Dec. 29, 1972
[21] Appl. No.: 319,278

[52] U.S. Cl. .............................. 29/193; 152/361 R
[51] Int. Cl. ............................................. B21f 37/00
[58] Field of Search .................. 245/1, 1.5, 2, 8, 10; 152/202, 361 R; 156/124; 29/193

[56] References Cited
UNITED STATES PATENTS

| | | | |
|---|---|---|---|
| 1,512,794 | 10/1924 | Pierce | 245/1.5 |
| 1,922,269 | 8/1933 | Wickwire, Jr. | 245/8 |
| 3,164,514 | 1/1965 | Day | 245/2 |

*Primary Examiner*—L. Dewayne Rutledge
*Assistant Examiner*—O. F. Crutchfield
*Attorney, Agent, or Firm*—James W. Williams, Jr.

[57] ABSTRACT

A bias steel wire belt is disclosed having essentially square cut ends. The belt is made by first cutting an unbiased belt and thereafter altering the position of the cords to a desired bias.

1 Claim, 4 Drawing Figures

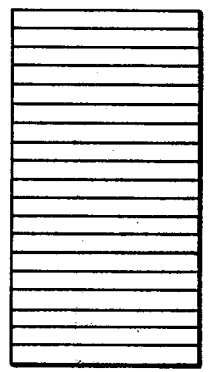
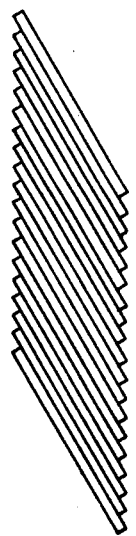
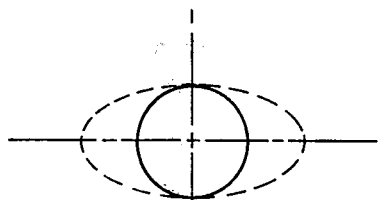
FIG. 1.  FIG. 2.  FIG. 3.
FIG. 4.

SQUARE CUT BIAS BELT OF STEEL TIRE CORD

BACKGROUND OF THE INVENTION

Bias steel wire belts for tires are generally fabricated by forming a loosely woven steel wire fabric using a synthetic, such as polyester, pick. The fabric is then calendered and cut on a desired bias of between about 15° to 30°.

STATEMENT OF THE INVENTION

This invention relates to a novel bias belt of steel wire for use in making steel bias belted tires and a novel method of manufacture. More specifically, the invention relates to a method comprising cutting a belt of steel wire from a plurality of essentially adjacent, parallel steel wire along a first path normal to the longitudinal axis of the wire and thereafter altering the arrangement of the wires such that the ends of the wires lie along a second path which second path forms an angle of between about 10° and 80° with the said first path.

The bias belt assembly produced as above-indicated has square cut ends contrasted with the bias cut of the typical prior art belts. A notable advantage realized through the use of the instant invention lies in the fact that the work required to cut a wire on a bias angle of 15°, for example, is over three times the work required to cut the same according to the instant invention. This difference in work can be reflected, as a practical matter, in terms of blade wear in the cutting operation.

BRIEF DESCRIPTION OF THE DRAWINGS

FIG. 1 is a schematic elevation view of the form in which a steel wire bias belt is cut.

FIG. 2 is a schematic elevation view of the form in which the steel wire bias belt of this invention is cut.

FIG. 3 is a schematic elevation view of a square cut steel bias belt made by altering the relative position of the wires from the form depicted under FIG. 2.

FIG. 4 graphically illustrates the plane of square cut wire as contrasted with that of wire cut along a bias angle.

DETAILED DESCRIPTION OF THE INVENTION

The term "steel wire" as employed herein is intended to mean single steel wire, steel wire strands or steel wire cords. According to this invention, an assembly of steel wires in essentially adjacent, parallel relationship is cut to predetermined dimensions normal to the longitudinal axis of the wires at the point of the cut. In other words, the plane of the cut essentially represents the minimum cross-section of the wire. The wire assembly to be cut is generally a loosely woven or non-woven fabric where the wires are held in a unitary composite structure. For example, steel tire cord is customarily woven to form a loose fabric having a polyester pick at spaced intervals. The cut rectangular shaped assembly in the form depicted in FIG. 2 is then altered to form a bias belt as depicted in FIG. 3. The alteration in shape can be made to any desired bias belt angle between 10° and 80° by conforming the assembly to a form or mold and securing the desired shape by a clamp to prevent interwire migration until the bias shaped assembly is fed to the calender where the bias form is thereafter retained by the constraint of a rubber matrix. Any other means for altering the shape of the rectangular wire assembly holding it in shape pending calendering may be used.

I claim:

1. A bias belt comprising a plurality of steel wires, in essentially adjacent, parallel relationship wherein the planar area of each of the terminal ends of each wire is essentially equal to the minimum cross-sectional area of each wire.

* * * * *